United States Patent
Kerr et al.

(10) Patent No.: US 9,684,376 B1
(45) Date of Patent: Jun. 20, 2017

(54) METHOD AND APPARATUS FOR CONTROLLING A TEXTURE OF A SURFACE

(71) Applicant: MOTOROLA SOLUTIONS, INC., Schaumburg, IL (US)

(72) Inventors: Steven John Kerr, Penang (MY); Mohd Wardi Iswali Aihsan, Kedah (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/009,694

(22) Filed: Jan. 28, 2016

(51) Int. Cl.
*G08B 3/00* (2006.01)
*G06F 3/01* (2006.01)
*G06F 3/0362* (2013.01)

(52) U.S. Cl.
CPC ............ *G06F 3/016* (2013.01); *G06F 3/0362* (2013.01)

(58) Field of Classification Search
None
See application file for complete search history.

(56) References Cited

U.S. PATENT DOCUMENTS

| | | | |
|---|---|---|---|
| 5,496,174 A | 3/1996 | Garner | |
| 6,154,201 A * | 11/2000 | Levin | G05G 9/047 345/156 |
| 7,245,292 B1 | 7/2007 | Custy | |
| 7,420,547 B2 * | 9/2008 | Takahashi | G06F 3/016 345/184 |
| 8,358,204 B2 | 1/2013 | Eldering | |
| 8,547,339 B2 | 10/2013 | Ciesla | |
| 8,553,005 B2 | 10/2013 | Ciesla et al. | |
| 2002/0080114 A1 * | 6/2002 | Numata | G05G 1/10 345/156 |
| 2004/0257339 A1 * | 12/2004 | Takahashi | G06F 3/016 345/156 |
| 2009/0002140 A1 * | 1/2009 | Higa | G06F 3/0412 340/407.1 |
| 2009/0015555 A1 * | 1/2009 | Takashima | G06F 3/016 345/158 |
| 2013/0307789 A1 * | 11/2013 | Karamath | G06F 3/016 345/173 |
| 2014/0240266 A1 * | 8/2014 | Rekimoto | G06F 1/1616 345/173 |
| 2014/0274372 A1 * | 9/2014 | Rosander | G07F 17/3209 463/31 |
| 2015/0242007 A1 * | 8/2015 | Iwaizumi | G06F 3/016 345/173 |
| 2015/0253851 A1 * | 9/2015 | Oh | G06F 3/016 345/179 |
| 2015/0324040 A1 | 11/2015 | Ciesla et al. | |
| 2016/0179332 A1 * | 6/2016 | Cho | G06F 3/04883 715/863 |
| 2016/0274664 A1 * | 9/2016 | Buttolo | H03K 17/955 |
| 2016/0364059 A1 * | 12/2016 | Chan | G06F 3/0362 |

* cited by examiner

*Primary Examiner* — Julie Lieu

(57) ABSTRACT

A method and apparatus for providing tactile feedback to a rotary knob is provided herein. During operation a rotary knob will have a surface pattern that will change smoothly from one pattern to another based on device functions currently being controlled by the rotary knob. So, for example, when the rotary knob is controlling a volume function, the surface will have a first textured pattern, and when the rotary knob is controlling a channel function, the surface will have a second, differing, textured pattern.

7 Claims, 9 Drawing Sheets

METHOD AND APPARATUS FOR CONTROLLING A TEXTURE OF A SURFACE

FIELD OF THE INVENTION

The present invention generally relates to providing tactile feedback to a user, and more particularly to a method and apparatus for controlling a texture of a surface to provide a sensory feedback to a user.

BACKGROUND OF THE INVENTION

As mobile devices incorporate more features, it is increasingly desirable to enable interface objects such as knobs and buttons with multiple functions to offer the user a way to interact with features of the radio. However, using such a knobs or buttons must allow the user to easily differentiate between modes of operation. Therefore, it would be desirable to have an interface object (e.g., a device rotary knob) that is capable of providing a feedback to a user, the feedback identifying specific menu items or device functions currently being controlled by the interface object.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for providing tactile feedback to a rotary knob is provided herein. During operation a rotary knob will have a surface pattern that will change from one pattern to another based on device functions currently being controlled by an interface object (e.g., a rotary knob). So, for example, when the rotary knob is controlling a volume function, the surface will have a first textured pattern, and when the rotary knob is controlling a channel function, the surface will have a second, differing, textured pattern.

Figure 1:
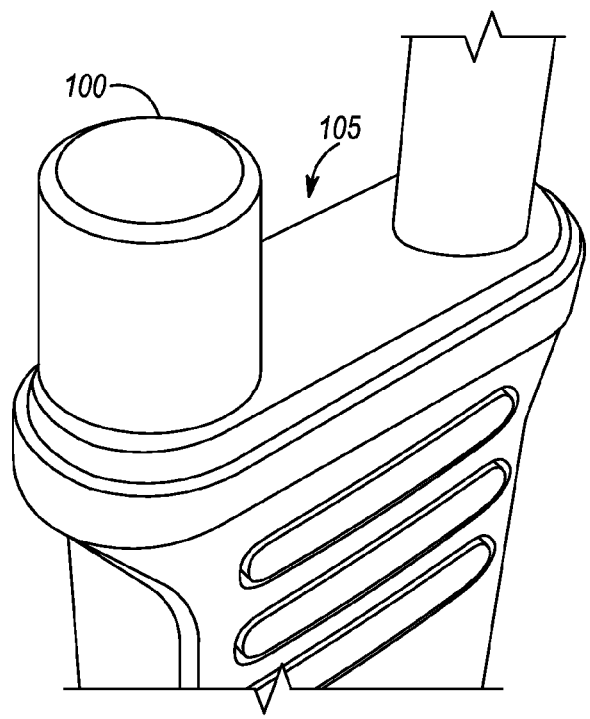
FIG. 1 is a perspective view of an interface knob in context with a portable radio.

FIG. 1 illustrates an electrical device with an interface object. In the example shown in FIG. 1, the electrical device is a portable radio 105 and the interface object is an interface control knob 100. The interface object is not limited to inclusion with a portable radio in FIG. 1, but can be used with other electrical devices such as other radios, telephones, amplifiers, power tools, large appliances, small appliances, vehicles, etc. The interface object can be used with most any electrical device that requires interfacing with a user.

Figure 2:
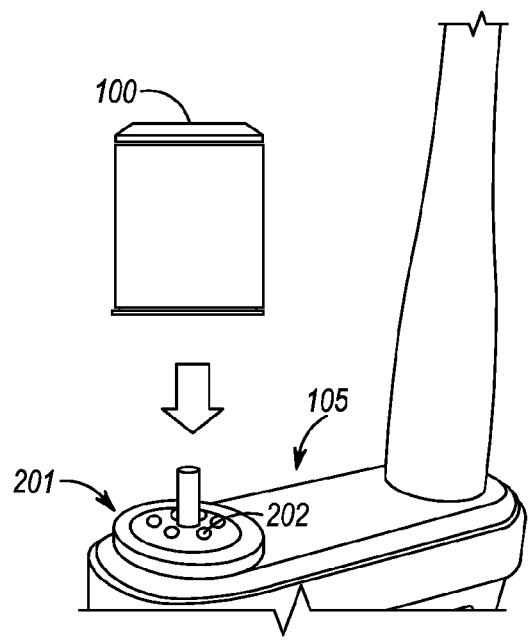
FIG. 2 illustrates the interface knob of FIG. 1.

As shown in FIG. 2, knob 100 is used as an interface object. Knob 100 is coupled to hub 201 to interact with radio 105. More specifically, knob 100 can communicate to a processor (307 in FIG. 3) via a series of electrical contacts 202 (only one labeled). Signals can be sent through contacts 202 to the processor from the control to indicate the changes rotation of the control which in turn will change values/variables of the mode of the device.

Figure 3:
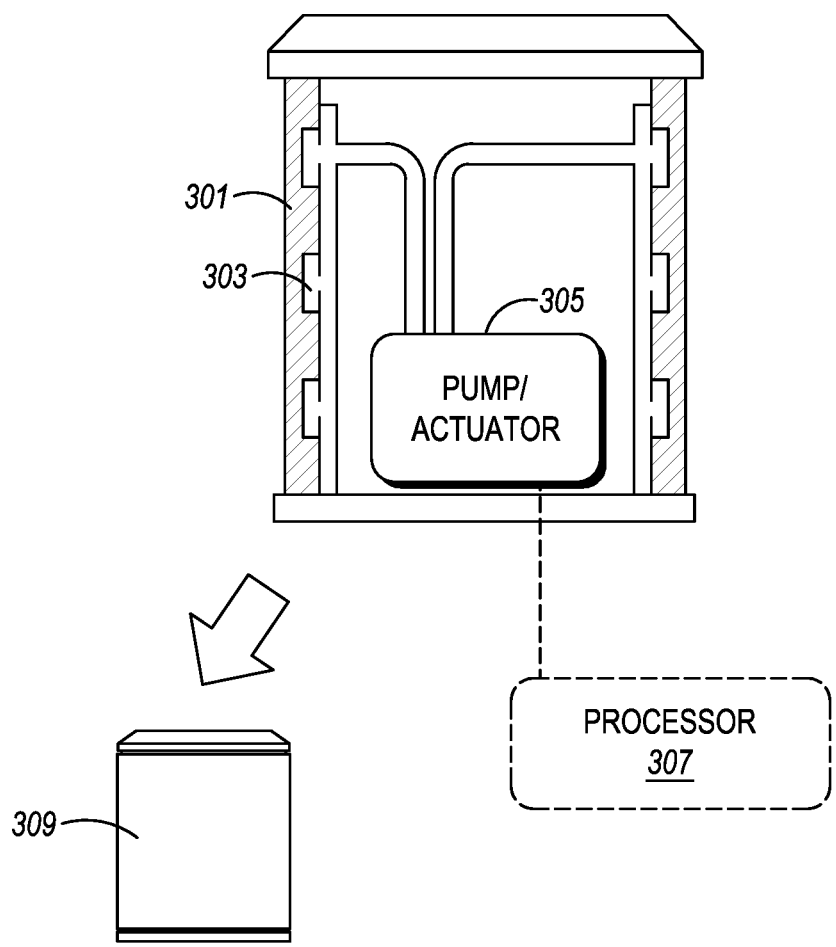
FIG. 3 is a cutaway view of the interface knob of FIG. 1.
Figure 4:
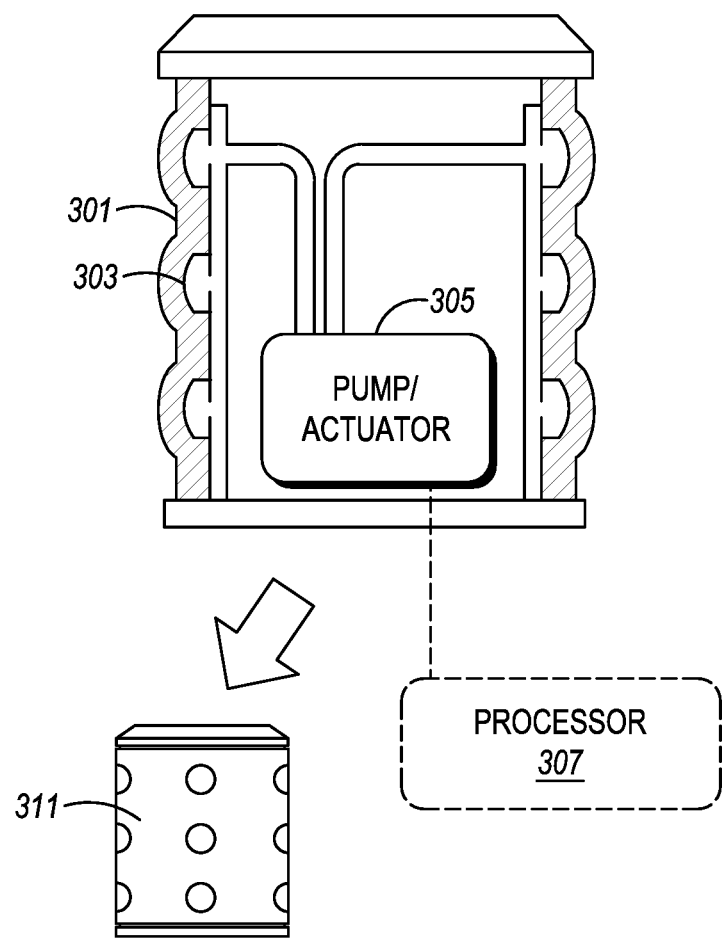
FIG. 4 is a cutaway view of the interface knob of FIG. 1.

With reference to FIG. 3 and FIG. 4, the control knob 100 has a flexible surface 301 having pockets/voids 303. Pockets 303 form voids interior to surface 301 such that the thickness of flexible surface 301 is thinner in areas over voids 303. Surface 301 can be manufactured from any flexible product such as, but not limited to silicone, rubber, soft plastic, . . . , etc.

Pump 305 is shown coupled to pockets 303 such that when pump 305 is activated, pressure builds within pockets 303, causing surface 303 to bulge over pockets 303. This is illustrated in FIG. 3 and FIG. 4. As shown in FIG. 3, pump 305 is not active. This causes no expansion of voids 303. This results in a smooth surface 301, as illustrated in knob 309. However, as shown in FIG. 4, pump 305 is active. This causes expansion of voids 303. This results in a surface 301 being raised in areas over voids 303, as illustrated in knob 311.

Processor 307 is provided to control pump/actuator 305. In a first embodiment of the present invention, processor 307 causes pump 305 to activate when knob 100 controls a particular function of radio 105. For example, when knob 100 controls a volume function, processor 307 activates pump 305, causing a patterned surface to exist on knob 100. This is illustrated in FIG. 5 and FIG. 6.

Figure 5:
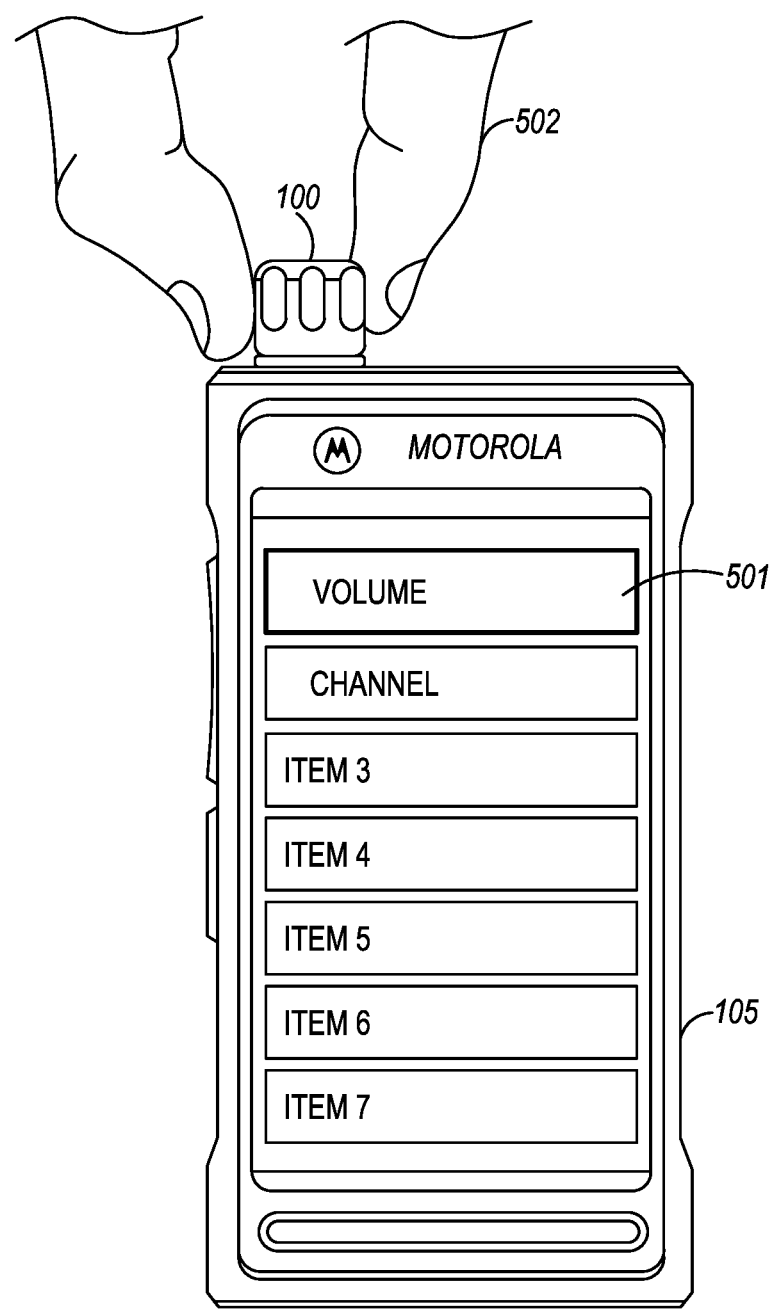
FIG. 5 illustrates changing modes of operation for the knob of FIG. 1.
Figure 6:
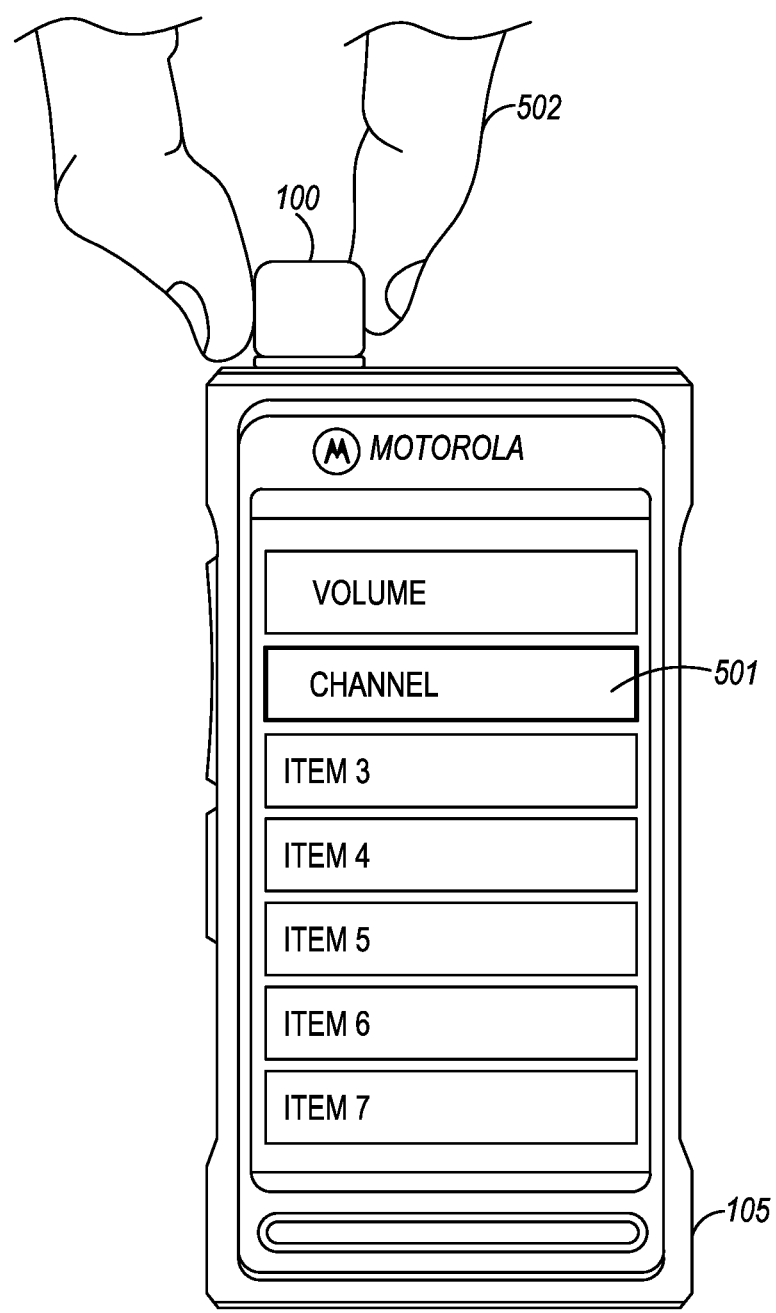
FIG. 6 illustrates changing modes of operation for the knob of FIG. 1.

As shown in FIG. 5 and FIG. 6, radio 105 may be equipped with a graphical user interface that highlights functionality 501 associated with knob 100. In other words, radio 105 may comprise a screen (not labeled with a reference number) that indicates a mode of operation for knob 100. The turning of knob 100 by fingers 502 in FIG. 5 causes a volume of radio 105 to increase or decrease, while the turning of knob 100 by fingers 502 in FIG. 6 causes a channel to increase or decrease. As shown in FIG. 5 and FIG. 6, the current mode for knob 100 is highlighted 501 on the touch screen. As is evident, when knob 100 controls a volume function, knob 100 has a first textured pattern, and when knob 100 controls a channel function, knob 100 has a second textured pattern (which may be no pattern at all). Also, while a display is shown to convey function/values to the user, audio information or visual indicators such as LEDs may also be used to indicate mode and value to user.

As discussed above, control knob 100 may be utilized to control many radio functions. For example, control knob 100 may serve as a volume-control interface, where turning control knob 100 may increase or decrease a volume level for radio 105. In a similar manner, control knob 100 may serve as a channel-control interface, where turning control knob 100 may available channels for radio 105. Other functions that may include, but are not limited to be talkgroups, zones, contacts, vibration settings (strength or pattern) for call alerts, task light brightness, profile settings (personalization), temperature settings, genre/artist/album/song selection, . . . , etc. With this in mind, additional pumps 305 and voids 303 may exist so that each pump is coupled to only a subset of voids 303. This is illustrated in FIG. 7.

Figure 7:
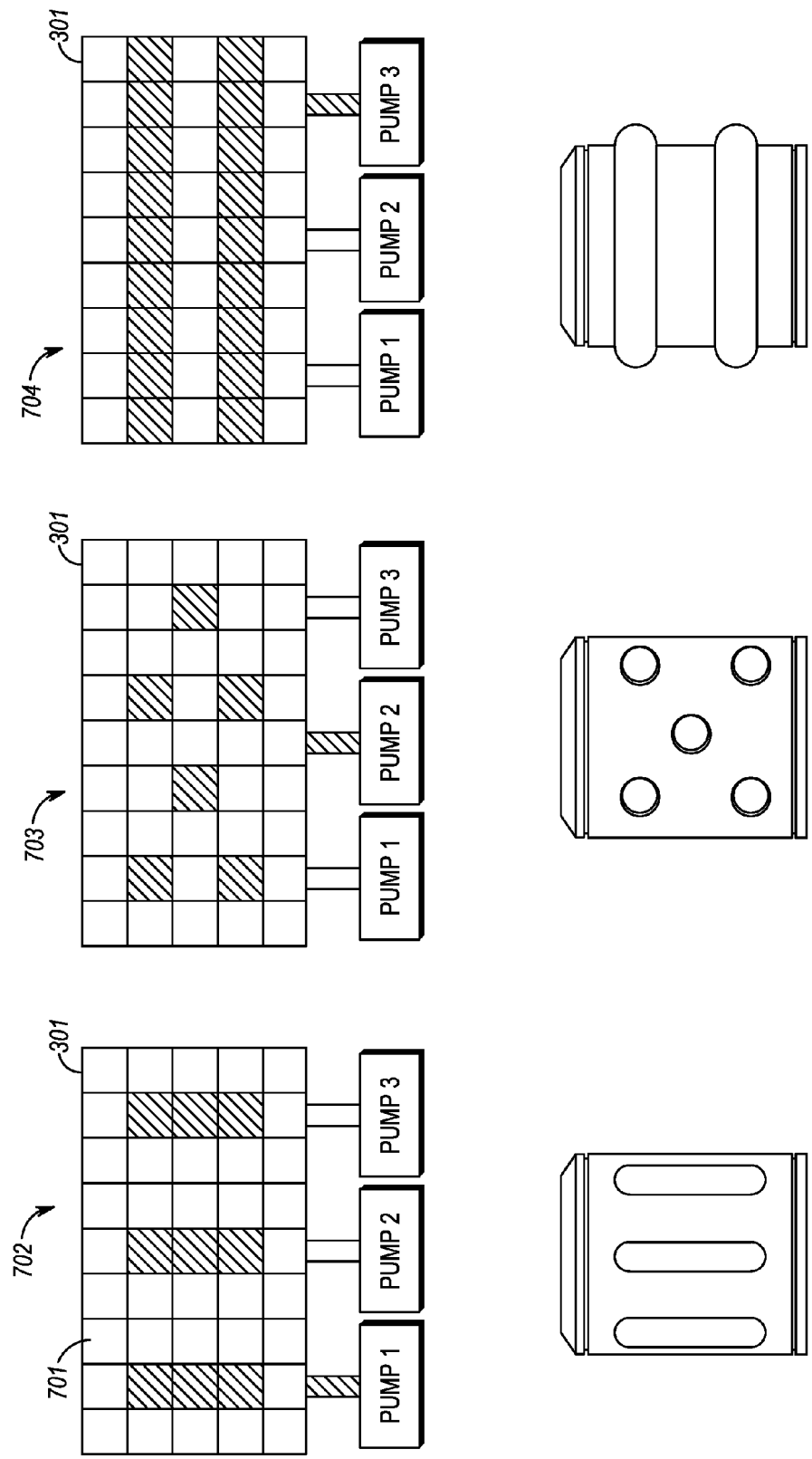
FIG. 7 illustrates changing patterns on the knob of FIG. 1.

In FIG. 7, areas 701 (only one labeled) show those regions where sub-surface voids exist within flexible membrane 301. Multiple actuators exist (in this particular example, actuators are pumps, but in alternate embodiments of the present invention the actuators may take any form needed to raise a surface pattern), each of which are coupled to a plurality of voids 303. More particularly, a first pump is coupled to a first plurality of voids, a second pump is coupled to a second plurality of voids, and a third pump is coupled to a third plurality of voids. The first, second, and third plurality of voids may or may not be non-overlapping. In other words, the first pump and the second pump may share a subset of voids in which they are connected.

In FIG. 7, "activated", or higher-pressure voids are shown in dark shading. As shown in FIG. 7, a first surface pattern 702 is shown on knob 100 when knob 100 is assigned a first functionality (e.g., volume control). The first surface pattern is obtained by activating only pump 1. A second surface pattern 703 is shown on knob 100 when knob 100 is assigned a second functionality (e.g., channel control). The second surface pattern is obtained by activating only pump 2. Finally, a third surface pattern 704 is shown on knob 100 when knob 100 is assigned a third functionality. The third surface pattern is obtained by activating only pump 3.

Cycling knob 100 between functions is well known in the art, and may be accomplished by pushing the control knob towards radio 105 to cycle through functionalities, or may be accomplished by a graphical user interface and a touch screen as shown in FIG. 5.

Figure 8:
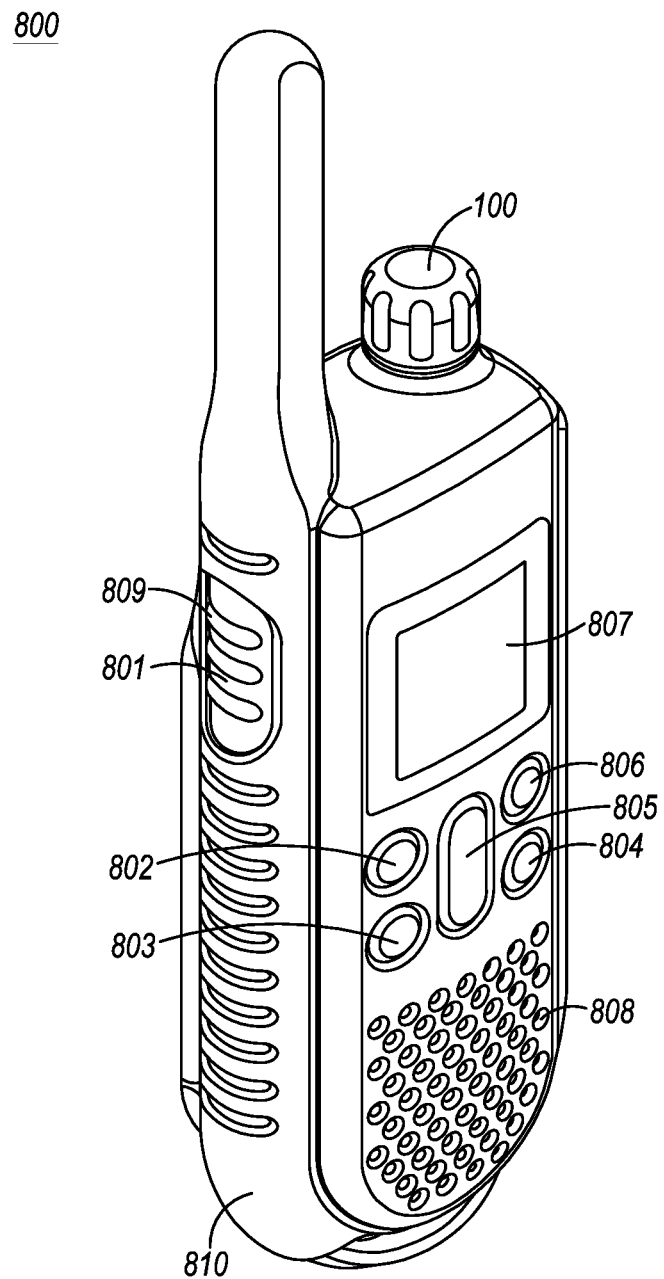
FIG. 8 illustrates a radio.

It should be noted that the above technique for indicating a mode of operation may be incorporated into other surfaces. This is illustrated in FIG. 8. As shown in FIG. 8, radio 800 includes knob 100 that changes its surface pattern based on a function currently being controlled by knob 100. The current function being controlled by knob 100 may be displayed on screen 807, or output as an audio signal via speaker 808. Switching between modes of operation for knob 100 may be accomplished by manipulating knob 100, or by manipulating interface buttons 802-806.

Radio 800 also comprises push-to-talk button 801. Pressing this button causes radio 800 to transmit voice on a particular channel/talkgroup combination. Push-to-talk button 801 may comprise sub-surface voids (as described above) that when activated, create a raised pattern 809 existing on button 801. Pattern 809 may vary based on, for example, a current channel or talkgroup being utilized by radio 800.

It should be noted that the textured surface as described above may exist on any portion of radio 800, including a body (or housing) 810 of radio 800. The surface pattern may vary based on a current mode being controlled by any button or knob existing on radio 800.

Figure 9:
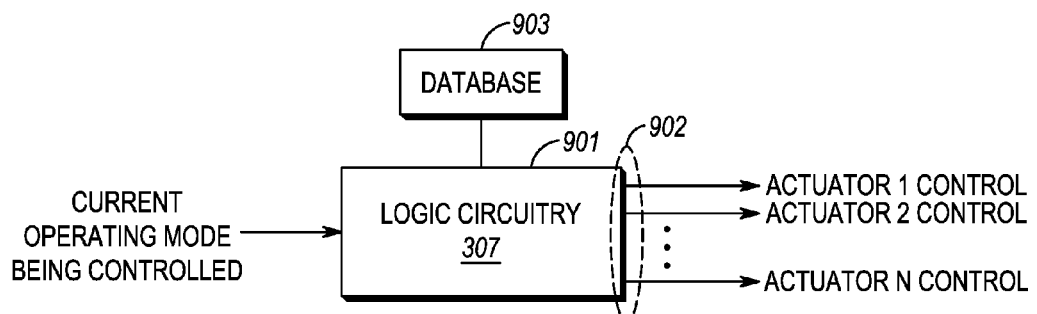
FIG. 9 is a block diagram of the radio of FIG. 1 and FIG. 9.

FIG. 9 is a block diagram showing logic circuitry 307. As shown, logic circuitry 307 has at least one input 901 and at least one output 902. During operation a current operating mode being controlled by a knob, button, or any interface enters logic circuitry 307 through input 901. Logic circuitry 307 accesses lookup table (database) 903 to determine a current surface pattern, and/or actuators (e.g., pumps) that need to be activated based on the current operating mode. Logic circuitry 307 then sends an activation signal to at least a subset of actuators (e.g., pumps) through output/interface 902.

Figure 10:
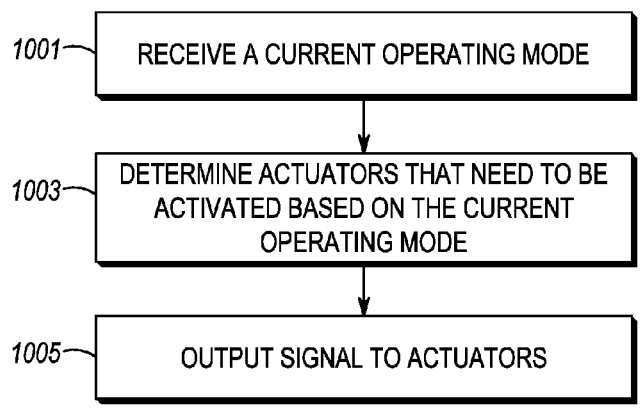
FIG. 10 is a flow chart showing operation of the radio of FIG. 9.

FIG. 10 is a flow chart showing operation of the radio of FIG. 9. The logic flow begins at step 1001 where logic circuitry 307 receives at input 901, a current operating mode of a button, knob, or interface object. As discussed, the current operating mode comprises a current device function being controlled by the button, knob, or interface object. Also, the button, knob, or interface object is capable of controlling a plurality of functions, but only one function at a time. For example, knob 100 may be capable of controlling operating modes of a channel-selection function and a volume-control function. However, knob 100 will only be able to control one of these functions at any particular time. Knob 100 will be able to cycle through the functions.

Continuing, at step 1003 logic circuitry 307 accesses database 903 and determines actuators that need to be activated based on the current operating mode. The actuators may comprise pumps that inflate small bladders or voids. Database 903 preferably comprises operating modes/actuator pairs, so that for any operating mode, logic circuitry 307 will be able to determine what actuators to activate.

Finally, at step 1005 logic circuitry 307 outputs (via interface 902) a signal to the actuators, causing the actuators to change a surface pattern to a texture that is based on the current operating mode of the button, knob, or interface object.

It should be noted that the term "actuator" is meant to mean any device, structure, or void capable of being activated to change a texture of a surface. Additionally, as discussed above, the current operating mode of the button, knob, or interface object may comprise a channel, talkgroup, or volume currently being controlled by the button, knob, or interface object. The actuators may comprise pumps. Also, the button, knob, or interface object is capable of controlling a plurality of device functions but only controls one device function at a time.

Figure 11:
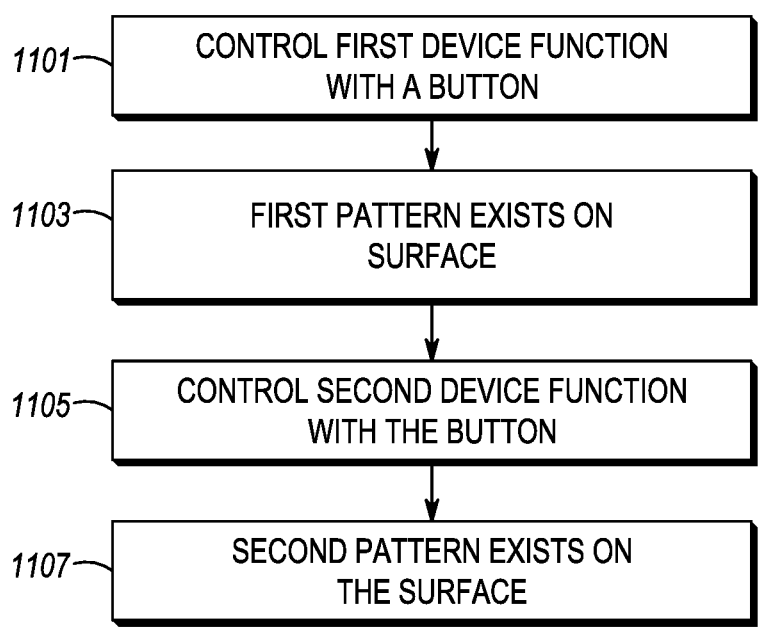
FIG. 11 is a flow chart showing operation of the radio of FIG. 9.

FIG. 11 is a flow chart showing operation of the radio of FIG. 9. The logic flow begins at step 1101 where radio 105 controls a first device function with a button, knob, or interface object 100. The logic flow continues to step 1103 where radio 105 causes a first pattern to exist on a surface, wherein the first pattern is based on the first device function. At step 1105, and at a later time, radio 105 controls a second device function with the button, knob, or interface object and causes a second pattern to exist on the surface (step 1107), wherein the second pattern is based on the second device function.

As discussed above, the first device function and the second device function comprise may comprise a talkgroup, channel, or volume level, and the first and the second patterns differ from each other. The pattern may also comprise a smooth surface.

In the foregoing specification, specific embodiments have been described. However, one of ordinary skill in the art appreciates that various modifications and changes can be made without departing from the scope of the invention as set forth in the claims below. For example, although the above embodiment was illustrated with a pump, increasing the pressure to voids within a surface to create a textured pattern, other techniques exist to create a textured pattern on the knob surface. For example, surface patterns may be achieved as described in U.S. Pat. No. 7,245,292, which uses pins to make a tactile interface. In addition, there should be no limit on the amount of patterns the actuators are capable of forming. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for controlling a texture of a surface, the method comprising the steps of:
   receiving a current operating mode of a button, knob, or interface object, wherein the current operating mode comprises a current device function being controlled by the button, knob, or interface object;
   determining actuators that need to be activated based on the current operating mode; and
   outputting a signal to the actuators, causing the actuators to change a surface pattern to a texture that is based on the current operating mode of the button, knob, or interface object;
   wherein the current operating mode of the button, knob, or interface object comprises a channel, talkgroup, or volume currently being controlled by the button, knob, or interface object.

2. The method of claim 1 wherein the actuators comprise pumps.

3. The method of claim 2 wherein the button, knob, or interface object is capable of controlling a plurality of device functions but only controls one device function at a time.

4. A method comprising the steps of:
   controlling a first device function with a button, knob, or interface object;
   causing a first pattern to exist on a surface, wherein the first pattern is based on the first device function;
   controlling a second device function with the button, knob, or interface object;

causing a second pattern to exist on the surface, wherein the second pattern is based on the second device function, wherein the first device function and the second device function comprise a talkgroup, channel, or volume level.

5. The method of claim 4 wherein the first and the second patterns differ from each other.

6. The method of claim 4 wherein the wherein the button, knob, or interface object is capable of controlling a plurality of device functions but only controls one device function at a time.

7. An apparatus comprising:
an input receiving a current operating mode of a button, knob, or interface object, wherein the current operating mode comprises a current device function being controlled by the button, knob, or interface object;
logic circuitry determining actuators that need to be activated based on the current operating mode; and
an output outputting a signal to the actuators, causing the actuators to change a surface pattern to a texture that is based on the current operating mode of the button, knob, or interface object; wherein the wherein the button, knob, or interface object is capable of controlling a plurality of device functions but only controls one device function at a time.

* * * * *